Sept. 5, 1933. S. NAISMITH 1,925,494
OPEN HEARTH FURNACE
Filed March 7, 1930 4 Sheets-Sheet 1

Inventor:
Samuel Naismith,
By Usina and Rauber
Attys

Sept. 5, 1933.        S. NAISMITH                1,925,494
OPEN HEARTH FURNACE
Filed March 7, 1930          4 Sheets-Sheet 2
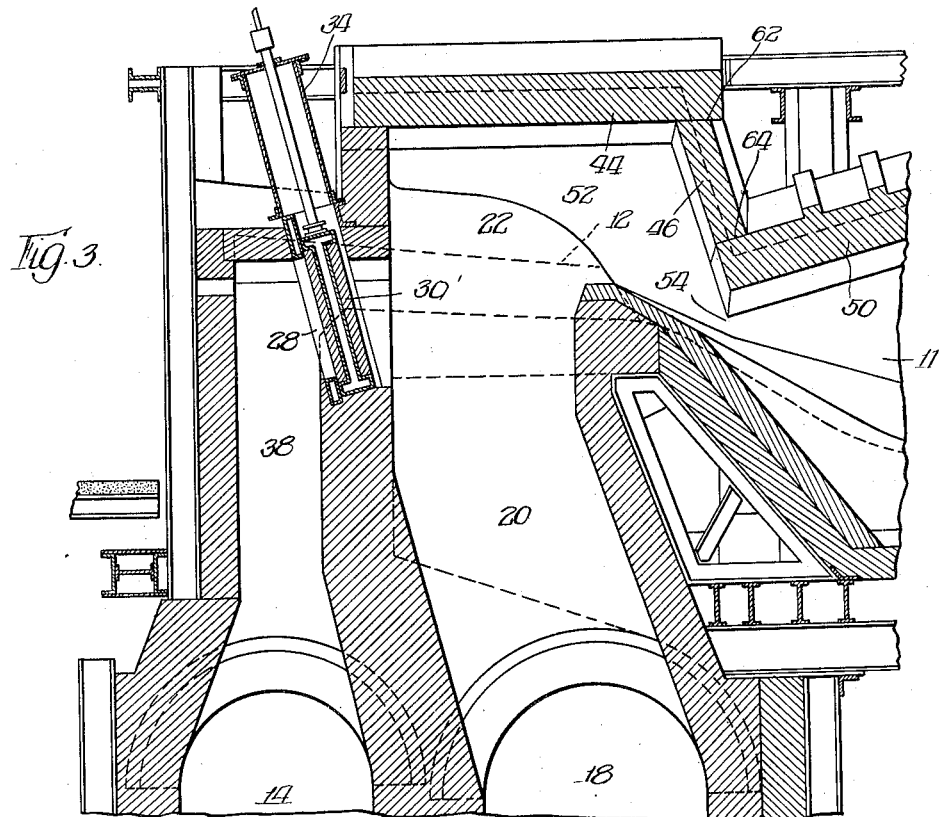
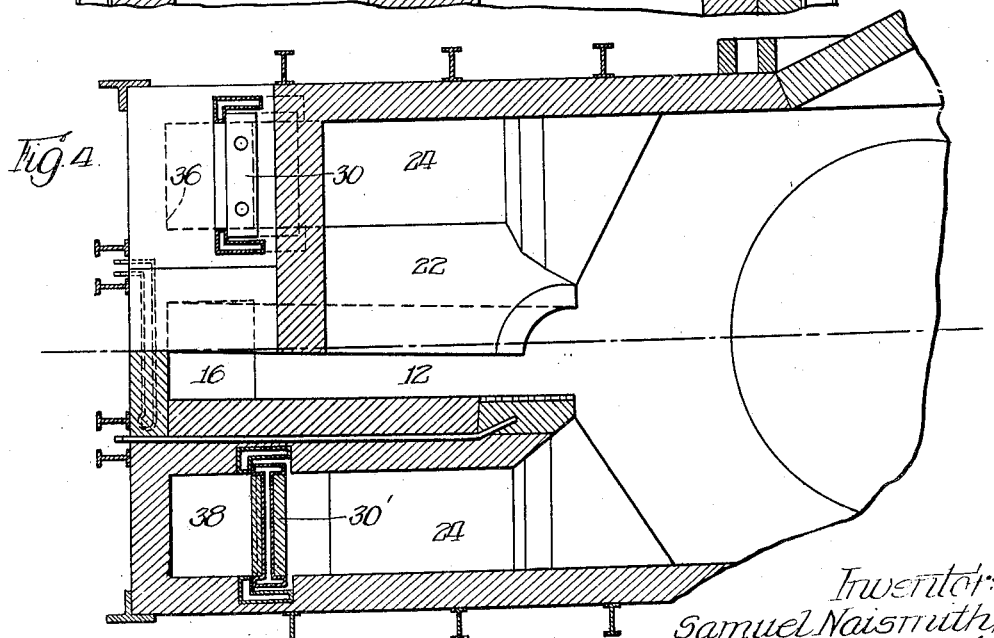

Sept. 5, 1933.  S. NAISMITH  1,925,494
OPEN HEARTH FURNACE
Filed March 7, 1930  4 Sheets-Sheet 3

Inventor:
Samuel Naismith,

Sept. 5, 1933.  S. NAISMITH  1,925,494
OPEN HEARTH FURNACE
Filed March 7, 1930   4 Sheets-Sheet 4

Inventor:
Samuel Naismith,
By Usina and Rauber
Attys

Patented Sept. 5, 1933

1,925,494

UNITED STATES PATENT OFFICE 1,925,494

OPEN HEARTH FURNACE

Samuel Naismith, Chicago, Ill.

Application March 7, 1930. Serial No. 434,018

10 Claims. (Cl. 263—15)

The invention relates to a new and improved open hearth furnace and more particularly to a construction for such furnaces whereby provision may be made for increasing the effective passage area between the furnace chamber and gas regenerators.

The use of blast furnace gas in open hearth furnaces is of comparatively recent origin. It was first introduced in soaking-pits and reheating furnaces and for the purpose of enriching it was mixed with producer gas. More recently it was tried out in the open hearth furnace with some degree of success. Owing, however, to the fact that the soaking-pits and reheating furnaces do not require as high temperature for performing their heating operations as the open hearth process requires, it was found necessary to mix the blast furnace gas with heavy hydrocarbon gases or liquid fuels, high in B. t. u. value.

Today a large amount of gas is being produced in the blast furnaces and the washing and cleaning appliances that later have been installed in industrial plants for treating the blast furnace gas operate in such an economical fashion that in most plants there is a surplus of gas over that required for the operation of stoves, boilers, gas engines, etc., and consequently if more gas is used for heating and melting purposes, greater economy results.

One type of open hearth furnace now used is built for preheating its gas (generally a combination of producer or blast furnace gas with a mixture of heavy hydro-carbons either liquid or gaseous). This furnace is adapted to preheat the gas and air separately in regenerators and to conduct the gas and air through separate passageways to the furnace chamber wherein the combustion takes place.

In another type of furnace fuel of high B. t. u. such as oil tar, natural gas, coke oven gas, pitch, tar, and the like is piped into the end of the furnace and the regenerating chambers and uptakes are used solely for preheating air. Thus in this type of furnace 't is not necessary to heat the two fuel conduits separately and both the regenerative chambers are used for air.

The furnace operating on producer gas is benefited by the sensible heat in the gas due to the close proximity of the gas producers to the furnace. The gas enters the checker chamber at about 1400° F. whereas the air enters at atmospheric temperature and for this reason the air preheating chamber is generally considerably larger than the gas preheater chamber. It can be readily understood that in order to burn blast furnace gas which enters the gas regenerators at atmospheric temperature because of the washing and cleaning of the gases, the gas regenerator should have a greater heating surface and in the reversal of the open hearth furnace a large amount of the products of combustion should enter the gas checkers in order to maintain a high temperature. Therefore gas chambers adapted for preheating blast furnace gas mixed with hydro-carbon gases, should be designed in such a manner as to supply to the gas regenerating chambers approximately the same amount of preheating gases as are supplied to the air regenerating chambers. This has not been possible in the furnaces in use today and it is accordingly an object of the present invention to produce a furnace which will satisfy the needs outlined.

Furthermore to insure the best results being obtained in burning a mixture of blast furnace gas with a mixture of one of the higher B. t. u. gases, the preheating temperature should be high enough to insure the breaking up of the hydrocarbons in the gases in order that a luminous high temperature-radiating flame will be obtained in the furnace. Another objection to the present open hearth furnaces, which prevents them from successfully burning low B. t. u. gases, is the inability to maintain relatively high temperatures in the gas chambers in which the gases are preheated prior to their entry to the gas port. This is owing to the fact that the gas port construction, which communicates with the gas regenerator, must, in order to be suited for the burning of producer gas, be small, in fact only about 20% of the area of the air ports. While a port of this size is ideal in the incoming end of a furnace burning blast furnace gas mixed with higher B. t. u. gases, it is obvious that on the outgoing end the air ports will receive by far the greater volume of hot gases leaving the furnace and the small gas port will not receive enough of such gases to perform the required preheating operation in the gas regenerator. In accordance with the present invention, a part of the outgoing gases from the furnace chamber are by-passed through an auxiliary flue which connects with the gas downtake and thereby increases the volume of the gases entering the gas checkerwork so as to produce the desired higher temperature on the incoming gases. On the incoming end of the furnace the auxiliary flue will be closed in order that the port opening will be of the desired small size, thereby insuring the most economical operation both on the ingoing and outgoing ends of the furnace.

Another object of the invention consists in the provision of a new design of furnace roof above the gas port, which has the effect of slowing up the gases on the outgoing end, thereby insuring that the gas outlet and auxiliary flue will receive more of the products of combustion than they would receive with a flat slope on the roof, which is common practice. A flat slope is designed to favor the air downtakes by pulling the gases away from the low mouth of the gas port. In accordance with the present invention there is a large space above the gas port into which preheated air is drawn on the intake end of the furnace, and acts as a reservoir for affording the syphonic action of the fuel stream coming from the gas port with sufficient air for combustion. The novel design is such as to force the air to mix with the gas on the top and sides of the gas stream leaving the mouth of the gas port.

Other objects and features of the invention will become apparent from a reading of the following description in the light of the accompanying drawings, in which—

Figs. 3 and 4 show another type of open hearth furnace equipped in accordance with the present invention.

Figure 2:
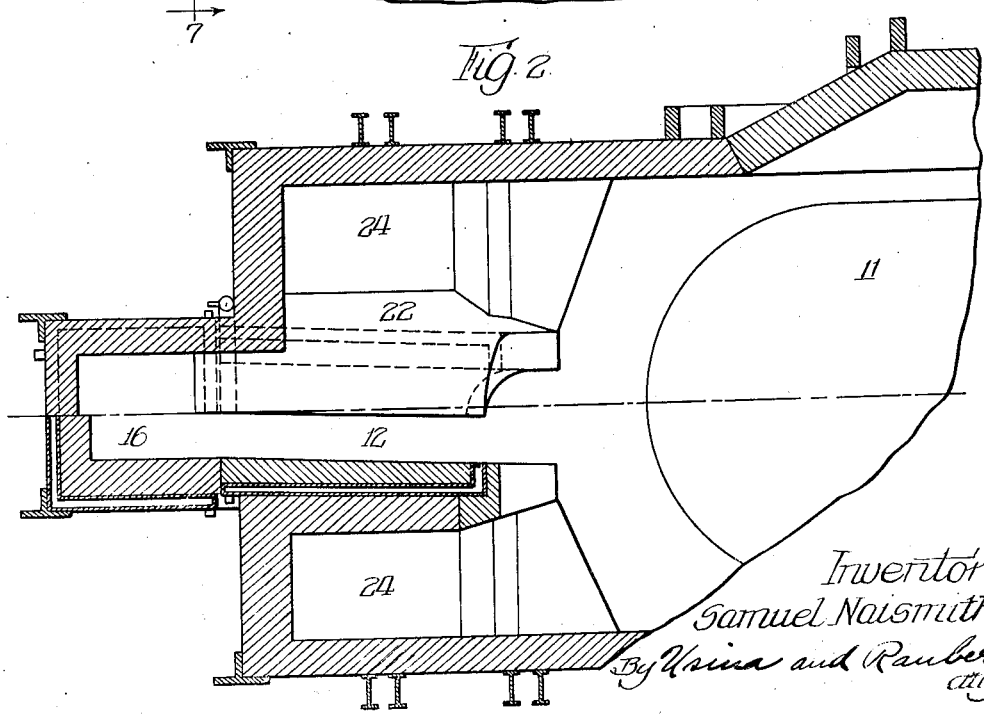

Turning to the drawings, the reference numeral 10 indicates a furnace of the Seiman's type comprising a furnace chamber 11 and a gas port 12 arranged to communicate therewith. Gas from the regenerator enters the furnace through a gas flue 14, a gas uptake 16, and the port 12. Similarly air enters the furnace from the regenerator through an air flue 18, uptakes 20, and through openings 24 (Fig. 2).

In order to keep the gas separated from the air until they are admitted to the combustion chamber the gas port 12 is formed by means of a brick arch 22 which is illustrated herein as being water cooled. Thus in operation the gas goes upwardly through the intake 16, through the port 12, and upon leaving the port mixes with the incoming air which is flowing through the passageways 24 filling the space above the brick arch 22.

Normally, heretofore, the brick arch 22 has extended rearwardly in the furnace to abut the rear wall 26, but a feature of the present invention consists in terminating the brick arch short of the rear wall, thereby leaving an opening 28 which, as illustrated, is adapted to be closed by means of a water cooled disk or mushroom valve 30. Furthermore the furnace wall and gas port arch located adjacent to the opening 28 have mounted within them a water cooled valve seat 32.

Thus in operation when the illustrated end of the furnace is serving as the incoming end, the valve 30 is closed and the gas goes upwardly through the intake 16 and outwardly through the port 12 as in the normal operation of the furnace. On the other hand when the illustrated end of the furnace is used as the outgoing end, the valve 30 is retracted into a pocket 34 and the outgoing products of combustion are free to escape not only through the air openings 24, 24 and the gas port 12, but they are likewise free to flow through the opening 28. Therefore it will be seen that by means of the arrangement described the area of the downtakes is increased on the outgoing end of the furnace.

Figure 1:
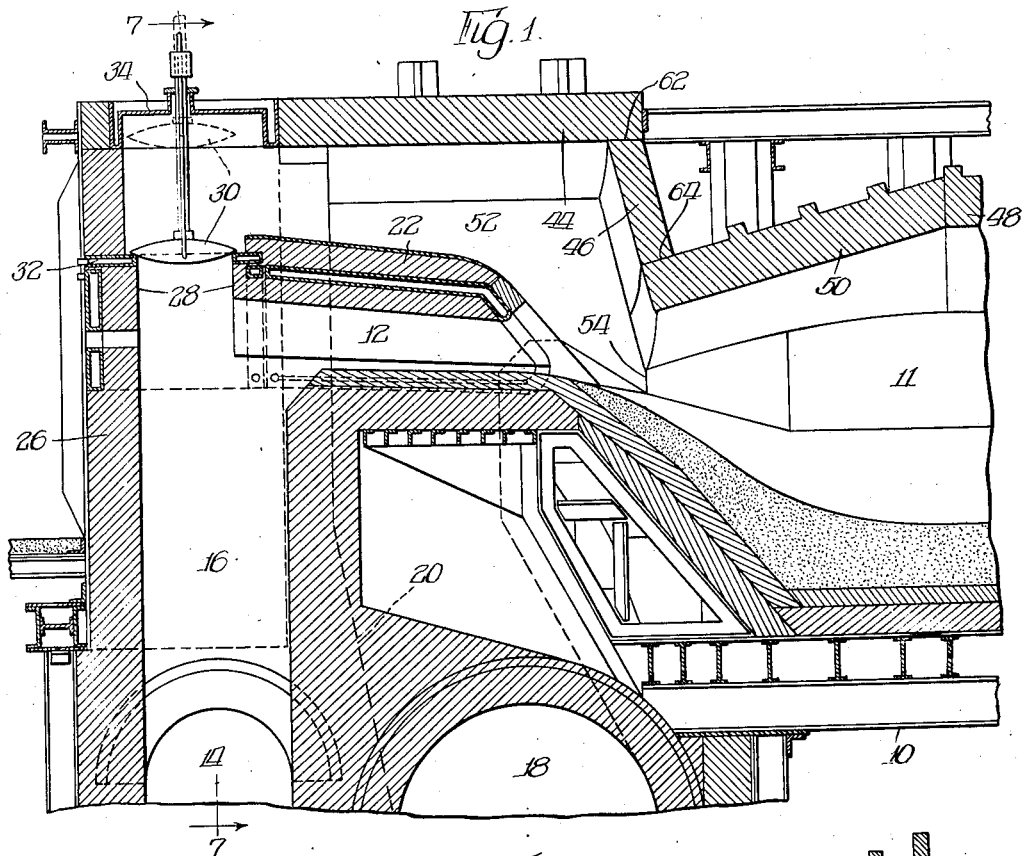
Figs. 1 and 2 show one type of open hearth furnace equipped in accordance with the present invention.
Figure 7:
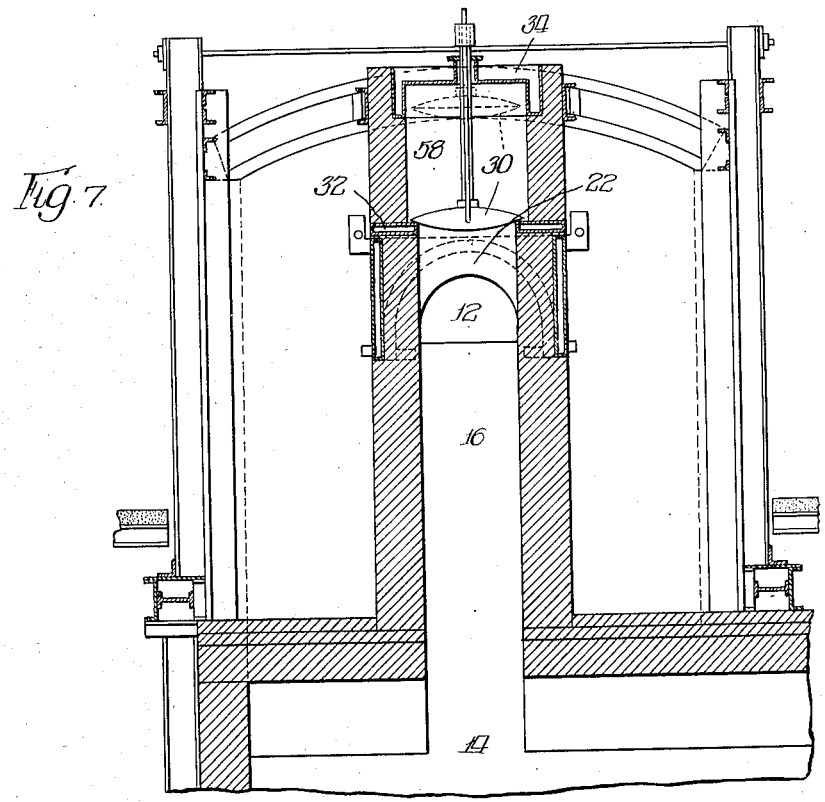
Fig. 7 is a sectional view taken along the line 7—7 of Fig. 1.

Figs. 3 and 4 illustrate another type of open hearth furnace which is similar to that disclosed in Figs. 1, 2, and 7 except that the furnace is provided with three passageways connecting the combustion chamber with the gas regenerative chambers. The furnace has the customary gas uptake 16 which communicates with the gas port 12 and in addition has supplemental downtake passageways 36 and 38 located upon opposite sides of the uptake passageway 16. As shown the supplemental passageways 36 and 38 communicates with the air uptakes 20 by means of openings 28 which are adapted to be closed by means of slidable dampers 30 and 30' (it is to be understood of course that mushroom or disk valves could be used in place of the sliding dampers illustrated). During normal operation of the furnace with the illustrated end serving as the intake end, the valves 30 and 30' governing the supplemental gas downtake passageways 36 and 38 are closed, under which condition the incoming gas flows upwardly through the intake or central port 16 (Fig. 4) and outwardly through the gas port 12. The air flows upwardly through the intakes or side ports 20 and mingles with the gas at the end of the brick arch 22. Reversely when the end of the furnace illustrated is employed as the outgoing end the valves 30 and 30' are thrown open, thereby opening the two supplemental downtake passageways 36 and 38 and communicating the combustion chamber 11 of the furnace with the gas regenerative chambers. Thus on the outgoing end there are three passageways communicating the combustion chamber with the gas regenerative chambers, namely the central passageway 16 and the side supplemental passageways 36 and 38.

Figure 5:
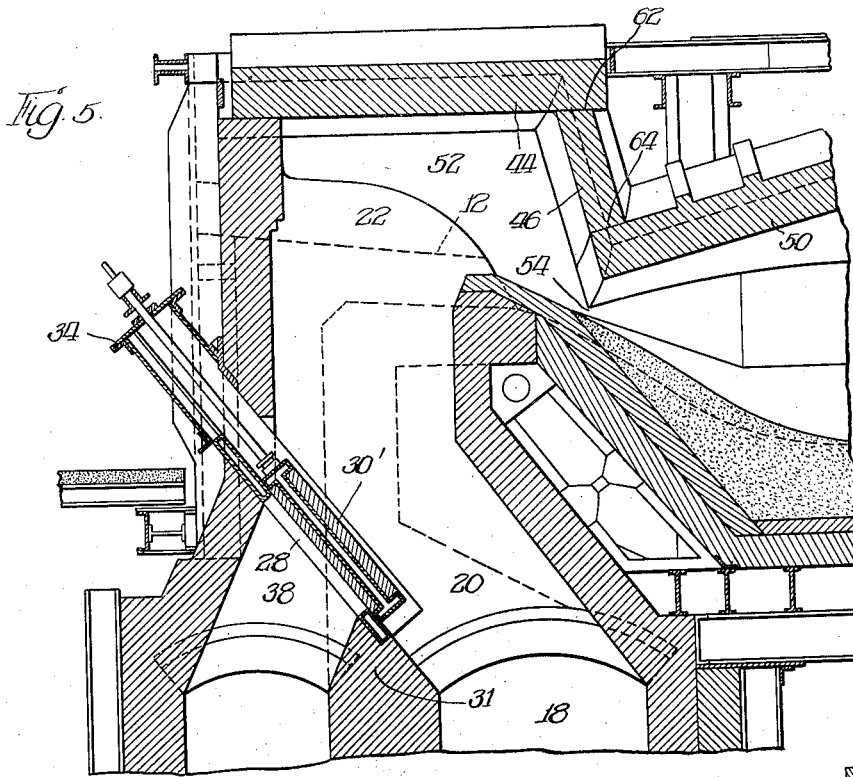
Figs. 5 and 6 show a third type of open hearth furnace equipped in accordance with the present invention.
Figure 6:
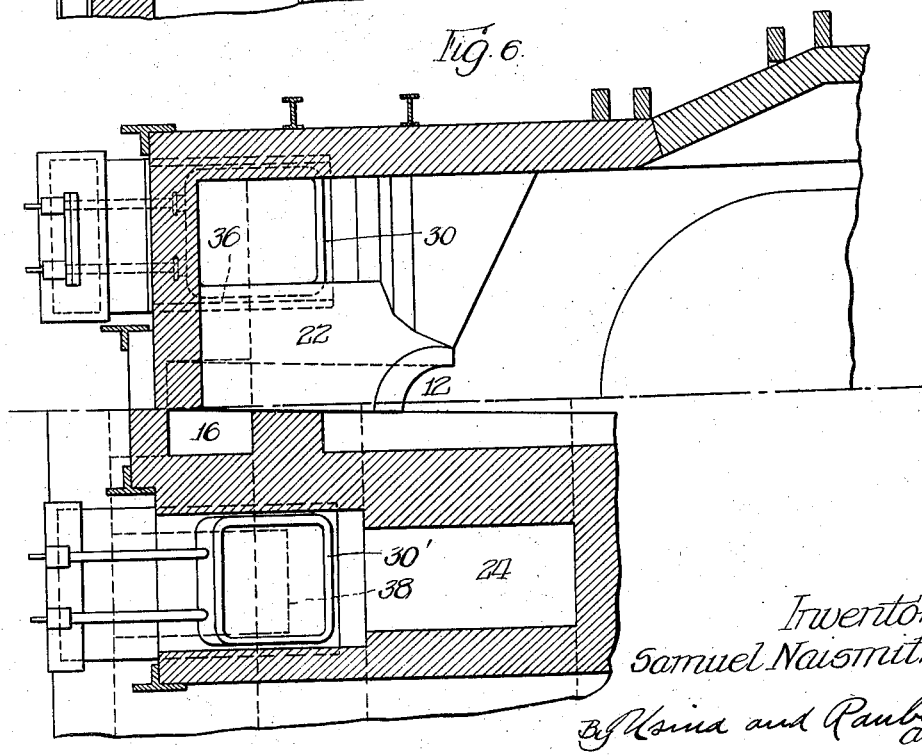

In the type of furnace shown in Figs. 5 and 6, the division wall 31 between the air uptakes 20 and the gas downtakes 36 and 38, is comparatively low in height as contrasted with the division wall of the furnace shown in Figs. 3 and 4. Otherwise the two furnace constructions are similar. In the furnace shown in Figs. 5 and 6 there is arranged the customary gas uptake 16 which communicates with the port 12 and there are provided two supplemental downtake passageways which communicate with the gas regenerative chambers on the outgoing end of the furnace. In operation, when the end illustrated is serving as the incoming end, the customary dampers 30 and 30' are closed. Gas enters through the intake 16 and the port 12 and mixes with the air coming through the side uptakes 20, 20. When the end serves as the outgoing end the dampers 30 and 30' are retracted to their inoperative positions, whereupon the products of combustion flow downwardly through five different paths, namely the two air downtakes 20, 20 and the three downtakes 16, 36 and 38 leading to the gas regenerative chambers. In this type of furnace the damper or valves 30 and 30' operate below the floor level and materially decrease the height of the division wall.

Figure 8:
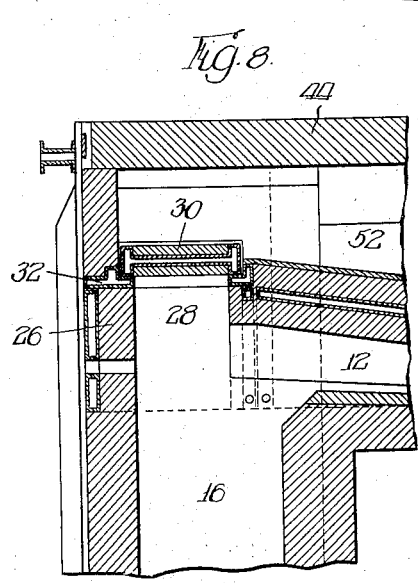
Figs. 8 and 9 show modifications of the arrangement illustrated in Figs. 1, 2, and 7.
Figure 9:
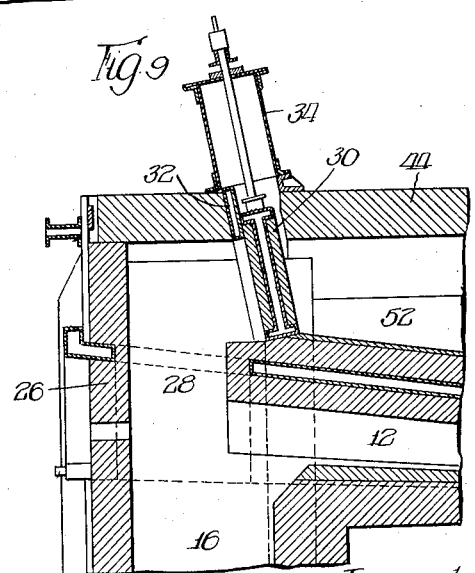

Figs. 8 and 9 both show modified ways of applying the invention to a furnace of the type shown in Figs. 1, 2, and 7. In furnaces of that particular type there is only a single passageway communicating the interior of the furnace with the gas regenerative chamber and this passageway alone serves on both the incoming and outgoing ends of the furnace. For example as shown in Fig. 1 the damper 30 controls the opening 28 which communicates the interior of the furnace with the gas uptake 16 and when the illustrated end is serving as the outgoing end the valve is opened and the passageway 16 serves as the sole communication with the gas regenerative chambers but the admission of products of combustion to the passageway 16 is increased owing to the opening of the valve 30. In Fig. 8 the passageway 28 of a furnace such as that shown in Fig. 1 is controlled by means of a horizontal sliding damper instead of a vertically moving disk valve and in Fig. 9 the opening is controlled by means of a vertically slidable damper 30 instead of a vertically movable disk valve such as shown in Fig. 1.

In the operation of the furnaces all of the valves are closed on the intake end of the furnace, thereby causing that end to operate in normal fashion and on the outgoing end of the furnace the valves are all opened, thereby increasing the effective area of the outlet passageway and permitting a greater quantity of the products of combustion to enter the gas chambers. As shown in the drawings the furnace roof at the end of the furnace comprises an end arch portion 44, abruptly sloping deflection wall 46, and a central portion 48 (Fig. 1) having its opposite ends arched and sloping as indicated by the reference numeral 50. It is to be observed that the portions 44, 46, and 50, of the furnace roof are separately formed to allow for complete and unopposed expansion and contraction along the lines 62 and 64. Furthermore the construction is such as to allow expansion of the parts 44 and 50 in opposite directions thereby preventing clamping or binding of the furnace during operation.

A number of beneficial results may be attributed to the novel construction of furnace roof, which comprises the horizontal portion 44, the nearly vertical deflection wall 46, and the section 50. For example the two former portions are arranged to form a large reservoir 52 located immediately above the brick arch 22 and the junction of the deflection wall 46 with the section 50 forms a restricted opening leading from the reservoir to the combustion chamber 11. In operation the deflection wall directs the air down directly onto the gas stream leaving the mouth of the gas port 12, insuring intimate and more complete mixture of the two gases with one another. As a result of procuring the more intimate and complete mixture, a better and more economical combustion takes place.

And then again the unusually large space 52 insures the supplemental passageways for receiving more of the products of combustion on the outgoing end than would be the case with the common practice of providing a flat slope on the roof from the end of the furnace to the restricted opening 54. The later type of roof is designed to favor the air downtakes by pulling the gases away from the low mouth of the gas port. The large space serves as a reservoir for supplying the syphonic action of the fuel stream with sufficient pre-heated air for combustion, and owing to its multiple functions, increases the efficiency of the furnace on both the ingoing and the outgoing ends.

Having thus described my invention, what I claim as new and desire to secure by Letters Patent of the United States is:

1. In the operation of a reversing regenerative open hearth furnace with blast furnace gas, the method which consists in passing the air and gas to the furnace through separate preheating chambers and through ports proportioned to the relative volumes of air and gas required for combustion and passing the outgoing gases from the furnace through ports of which that leading to the gas preheating chamber is enlarged relative to that leading to the air preheating chamber.

2. In the operation of a reversing regenerative open hearth furnace with blast furnace gas, the method which consists in passing the gas from its preheating chamber through a comparatively small port area to the furnace and passing the furnace gas through a comparatively large port area to the gas-preheating chamber.

3. An open hearth furnace having, in combination, a furnace chamber, a gas port, gas and air regenerators, uptakes leading from the air regenerators to the furnace chamber, uptakes leading from the gas regenerators and communicating with the gas port and thus with the furnace chamber, a supplemental passageway connecting the gas regenerators with the furnace chamber for diverting a large proportion of the outgoing gases through the gas regenerators, and means comprising a damper for governing the effective area of the supplemental passageway.

4. An open hearth furnace having, in combination, a furnace chamber, a gas port, gas and air regenerative chambers, passageways leading from the air regenerative chamber to the furnace chamber, another passageway connecting the gas regenerative chamber with the gas port and thus the furnace, and supplemental passageways communicating the gas regenerative chamber with the air passageways for diverting a large proportion of the outgoing gases through the gas regenerative chamber.

5. An open hearth furnace having, in combination, a furnace chamber, a gas port, gas and air regenerative chambers, passageways leading from the air regenerative chamber to the furnace chamber, another passageway connecting the gas regenerative chamber with the gas port and thus the furnace, supplemental passageways communicating the gas regenerative chamber with the air passageways for diverting a large proportion of the outgoing gases through the gas regenerative chambers, and means including dampers positioned in said supplemental passageways at their junction with the air passageways, said dampers controlling the proportions of the outgoing gases diverted by said supplemental passageways.

6. An open hearth furnace having, in combination, a furnace chamber, a gas port, gas and air regenerative chambers, a main central passageway connecting the gas regenerative chamber with the gas port, air passageways connecting the air regenerative chamber with the furnace chamber, and means for admitting a greater portion of the outgoing gases to the gas regenerative chamber than is admitted to the air regenerative chamber including supplemental passageways leading from the gas regenerative chamber and communicating with the furnace chamber, said supplemental passageways being provided with means for varying their effective area, whereby the proportion of outgoing gases thus diverted can also be varied.

7. An open hearth furnace having in combination therewith, a furnace roof, an extremity of said roof comprising horizontal end section extending over the brick arch of the gas port and inwardly beyond the end of the port, and a deflection wall extending downwardly from said end section, said wall uniting at its lower end with the central portion of the furnace roof.

8. An open hearth furnace having in combination therewith, a furnace roof, an extremity of said roof comprising horizontal end section extending over and a distance above the brick arch of the gas port, said end section also extending inwardly beyond the end of the port, the central portion of the furnace roof extending over the combustion chamber, and a separately formed wall connecting the end section of the furnace roof with the central portion.

9. An open hearth furnace having in combination therewith, a furnace roof including a central arched portion and horizontal end sections, each end section extending over the brick arch of the gas port and inwardly beyond the end of the port, and a substantially vertical deflection wall connecting each end section with the central portion, said end section and deflection wall providing a reservoir for preheated air.

10. An open hearth furnace having in combination therewith, a furnace roof including a central arched portion and end sections, each end section extending over the brick arch of the gas port and inwardly beyond the end of the port, and a substantially vertical deflection wall connecting each end section with the central portion, said end section and deflection wall providing a reservoir for preheated air, and said arched central portion terminating adjacent and substantially opposite the gas port and forming a restricted passage from the reservoir to the furnace chamber.

SAMUEL NAISMITH.